United States Patent [19]

Lagakos et al.

[11] Patent Number: 4,979,798
[45] Date of Patent: Dec. 25, 1990

[54] PRESSURE SENSITIVE OPTICAL FIBER HAVING OPTIMIZED COATINGS

[75] Inventors: Nicholas Lagakos, Silver Spring, Md.; Joseph A. Bucaro, Herndon, Va.

[73] Assignee: The United States of America as represented by the Secretary of the Navy, Washington, D.C.

[21] Appl. No.: 423,176

[22] Filed: Oct. 18, 1989

[51] Int. Cl.$^5$ ................................................ G02B 6/22
[52] U.S. Cl. ............................. 350/96.33; 350/96.29
[58] Field of Search ............... 350/96.23, 96.29, 96.30, 350/96.33, 96.34, 96.32

[56] References Cited

U.S. PATENT DOCUMENTS

| | | | |
|---|---|---|---|
| 3,641,332 | 2/1972 | Reick et al. | 350/96.32 X |
| 3,901,674 | 8/1975 | Strack et al. | 350/96.32 X |
| 4,133,664 | 1/1979 | Aulich et al. | 350/96.32 X |
| 4,427,263 | 1/1984 | Lagakos et al. | 350/96.33 |
| 4,621,896 | 11/1986 | Lagakos et al. | 350/96.29 |
| 4,709,987 | 12/1987 | Blackburn et al. | 350/96.34 |

OTHER PUBLICATIONS

Pressure Desensitization of Optical Fibers, N. Lagakos and J. A. Bucaro, Applied Optics, vol. 20, No. 15, 1 Aug. 1981, pp. 2716–2720.
Phase-Modulated Fiber Optic Acoustic Sensors, N. Lagakos and J. Bucaro, ISA Transactions, vol. 28, No. 2, 1989, 6 pages.
Optimizing Polymer Coatings for Fiber Optic Acoustic Sensors, N. Lagakos and J. A. Bucaro, International Wire and Cable Symposium Proceedings, Nov. 1988, pp. 593–597.
Frequency and Temperature Dependence of Elastic Moduli of Polymers, N. Lagakos, J. Jarzynski, J. H. Cole and J. A. Bucaro, J. Appl. Phys., 59(12), 15 Jun. 1986, pp. 4017–4031.
Lagakos et al., "Optimizing Fiber Coatings for Interferometric Acoustic Sensors", IEEE J. of Quan. Elect., vol. QE-18, No. 4, Apr. 1982, pp. 683–689.
Giallorenzi et al., "Optical Fiber Sensor Technology", IEEE J. of Quan. Elect., vol. QE-18, No. 4, Apr. 1982, pp. 626–665.
Lagakos et al., "Ultrasonic Sensitivity of Coated Fibers", J. of Lightwave Tech., vol. LT-1, No. 3, Sep. 1983, pp. 495–497.
Hughes et al., "Static Pressure Sensitivity Amplification in Interferometric Fiber-Optic Hydrophones", Applied Optics, vol. 19, No. 1, Jan. 1980, pp. 98–107.

Primary Examiner—John D. Lee
Attorney, Agent, or Firm—Thomas E. McDonnell; Peter T. Rutkowski

[57] ABSTRACT

The acoustic pressure sensitivity of an optical fiber waveguide is maximized by surrounding it with an outer coating which is selected from a material having high Young's modulus and low bulk modulus.

2 Claims, 4 Drawing Sheets

A = OPTICAL CORE  } OPTICAL FIBER WAVEGUIDE
B = OPTICAL CLADDING
C = SUBSTRATE
D = SOFT FIRST COATING  } JACKETING
E = HARD SECOND COATING

PRESSURE SENSITIVE OPTICAL FIBER HAVING OPTIMIZED COATINGS

FIELD OF THE INVENTION

This invention relates to coatings for optical fibers to maximize their acoustic sensitivity and more particularly to such coatings which are selected from materials having high Young's modulus and/or low bulk modulus.

BACKGROUND DESCRIPTION

Phase modulation in single-mode optical fibers has been successfully used as a transduction mechanism for detecting environmental changes such as pressure, acoustic fields, magnetic and electric fields, and temperature. Mach-Zehnder interferometric fiber-optic sensors have been studied analytically and have been tested both in the laboratory and in real environments and demonstrate very promising performance.

With an interferometric fiber optic sensor as shown in FIG. 1, optimum performance is achieved with maximum signal to noise ratio which signal is obtained by maximizing the sensitivity of the sensing fiber and desensitizing the sensitivity of the lead and reference fibers. U.S. Pat. No. 4,427,263 issued to Lagakos et al. on Jan. 24, 1984, discloses pressure insensitive optical fibers for use in the reference and lead arms of the interferometer.

The acoustic sensitivity of an optical fiber can be maximized by appropriately selecting the fiber composition and design, as will be disclosed.

The pressure sensitivity of the optical phase in a fiber is defined as the magnitude of $\Delta\phi/\phi\Delta P$, where $\Delta\phi$ is the shift in the phase delay $\phi$ due to a pressure change $\Delta P$. If a given pressure change, $\Delta P$, results in a fiber core axial strain $\epsilon_z$ and radial strain $\epsilon_r$, then it can be shown that:

$$\frac{\Delta\phi}{\phi} = \epsilon_z - \frac{n^2}{2}[(P_{11} + P_{12})\epsilon_r + P_{12}\epsilon_z]. \qquad (1)$$

Here $P_{11}$ and $P_{12}$ are the elasto-optic coefficients of the core and n is the refractive index of the core. The first term in equation (1) is the part of $\Delta\phi/\phi\Delta P$ which is due to the fiber length change, while the second and third terms are the parts due to the refractive index modulation of the core, which is related to the photoelastic effect. Stated another way $\Delta\phi/\phi\Delta P$=the algebraic sum of the phase change due to the fiber length change plus phase change due to refractive index change. The objective is to maximize the fiber sensitivity $\Delta\phi/\phi\Delta P$.

A typical optical fiber (FIG. 2a) is composed of a core, cladding, and a substrate from glasses having similar properties. This glass fiber is usually coated with a soft rubber and then with a hard plastic. In order to calculate the sensitivity as given in Eq.(1) the strains in the core $\epsilon_z$ and $\epsilon_r$ must be related to properties of the various layer of the fiber. The strains $\epsilon_z$ and $\epsilon_r$, which are related to the geometry and composition of the fiber, can be calculated from the stresses and displacements in the various fiber layers by applying the appropriate boundary conditions. In this analysis we have taken into account the exact geometry of a typical four layer fiber as shown in FIG. 2a.

The polar stresses $\tau_r$, $\tau_\theta$, and $\tau_z$ in the fiber are related to the strains $\epsilon_r$, $\epsilon_\theta$, and $\epsilon_z$ as follows:

$$\begin{bmatrix} \tau_r^i \\ \tau_\theta^i \\ \tau_z^i \end{bmatrix} = \begin{bmatrix} (\lambda^i + 2\mu^i) & \lambda^i & \lambda^i \\ \lambda^i & (\lambda^i + 2\mu^i) & \lambda^i \\ \lambda^i & \lambda^i & (\lambda^i + 2\mu^i) \end{bmatrix} \begin{bmatrix} \epsilon_r^i \\ \epsilon_\theta^i \\ \epsilon_z^i \end{bmatrix} \qquad (2)$$

where i is the layer index (0 for the core, 1 for the cladding, etc.) and $\lambda^i$ and $\mu^i$ are the Lame parameters which are related to the Young's modulus, $E^i$, and Poisson's ratio, $V^i$, as follows:

$$\lambda^i = \frac{V^i E^i}{(1 + V^i)(1 - 2V^i)}, \quad \mu^i = \frac{E^i}{2(1 + V^i)} \qquad (3)$$

For a cylinder the strains can be obtained from the Lame solutions $$\epsilon_r^i = U_o^i + \frac{U_1^i}{r^2} \qquad (4)$$

$$\epsilon_\theta^i = U_o^i - \frac{U_1^i}{r^2}$$

$$\epsilon_z^i = W_o^i$$

where $U_o^i$, $U_1^i$, and $W_o^i$ are constants to be determined. Since the strains must be finite at the center of the core, $U_1^0=0$.

For a fiber with m layers, the constants $U_o^i$, $U_1^i$, and $W_o^i$ in Eq. (4) are determined from the boundary conditions:

$$\tau_r^i|_{r=r_i} = \tau_r^{i+1}|_{r=r_i} (i=0,1,\ldots,m\text{-}1) \qquad (5)$$

$$u_r^i|_{r=r_i} = u_r^{i+1}|_{r=r_i} (i=0,1,\ldots,m\text{-}1) \qquad (6)$$

$$\tau_r^m|_{r=r_m} = -P, \qquad (7)$$

$$\sum_{i=0}^{m} \tau_z^i A_i = -PA_m \qquad (8)$$

$$\epsilon_z^0 = \epsilon_z^1 = \ldots = \epsilon_z^m \qquad (9)$$

where $u_r^i(=\int \epsilon_r^i dr)$ is the radial displacement in the $i^{th}$ layer, and $r_i$ and $A_i$ are the radius and the cross section area of the $i^{th}$ layer respectively. Equations (5) and (6) describe the radial stress and displacement continuity across the boundaries of the layers. Equations (7) and (8) assume that the applied pressure is hydrostatic. Equation (9) is the plane strain approximation which ignores end effects. For long thin cylinders, such as fibers, it introduces an error of less than 1%. Using the boundary conditions described by Eqs. (5)–(9), the constants $U_o^i$, $U_1^i$, and $W_o^i$ are determined and $\epsilon_r^0$ and $\epsilon_z^0$ are calculated from Eq.(4). Then, from Eq.(1) the sensitivity, $\Delta\phi/\Delta\phi P$, can be found.

In the past no one has recognized the relationship between the bulk modulus, Young's modulus of the fiber coating, the fiber thickness, and the the resultant acoustic pressure sensitivity of the optical fiber.

SUMMARY OF THE INVENTION

Accordingly, it is a general object of the invention to provide a pressure sensitive optical fiber waveguide having optimum sensitivity.

It is a more specific object of the invention to optimize the optical fiber waveguide pressure sensitivity per given area of fiber.

It is a further object of the invention to optimize the optical fiber waveguide pressure sensitivity in the sensor arm of an interferometric acoustic sensor.

These and other objects of the invention are accomplished by having a pressure sensitive optical fiber which is coated with materials having high Young's modulus and/or low bulk modulus. Once the Young's and bulk modulus of a coating material are established, the acoustic pressure sensity of that coated fiber can be calculated.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENT

Figure 1:
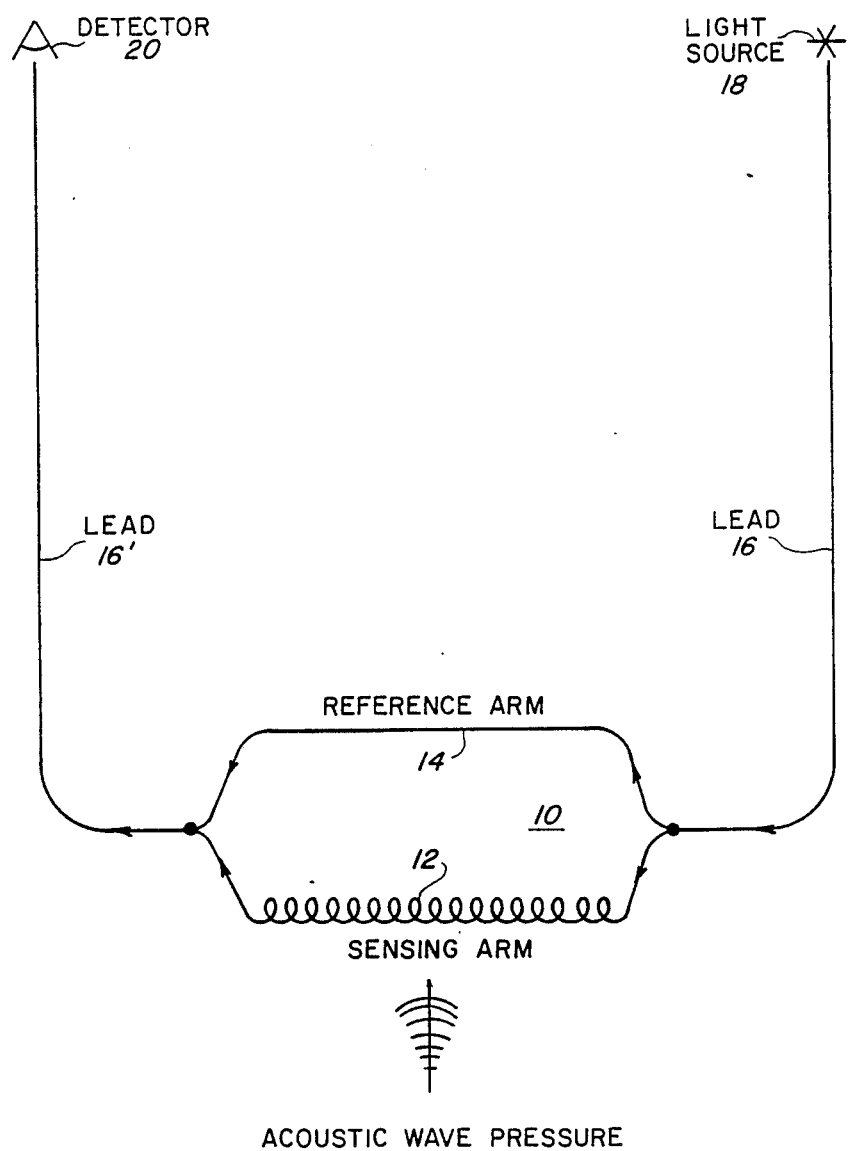
FIG. 1 is an illustration of a Mach-Zehnder optical fiber interferometer and leads thereto for sensing external acoustic pressure.

As in most interferometric sensors, a Mach-Zehnder arrangement was used (shown schematically in FIG. 1). FIG. 1 shows an apparatus in the form of a Mach-Zehnder optical fiber interferometer 10 for sensing acoustic wave pressure. Optical fibers 12 and 14, making up the sensing and reference arms, respectively, are relatively short lines, usually just a few meters or less. The sensing arm is obviously exposed to the environment for encountering the conditions it is designed to sense. The reference arm may be isolated or shielded by the environment (means not illustrated) or since it is relatively short, it may be exposed to the environment along with the sensing arm. This, of course, depends upon its type of service.

The optical fiber interferometer performs in the usual manner. A light source 18 introduces light into lead optical fiber 16 where it travels and is subsequently divided to enter parallel arms 12 and 14. The light passes through the arms where a relative phase shift is induced in the sensing arm by a copndition such as a magnetic field or acoustic wave. The light is then recombined and passed through lead 16' back to detector 20 where the extent of induced phase shifts is detected and converted into a meaningful reading which is in proportion to the magnitude of the conditions causing the phase shift. If there is an acousto-optic non-reciprocity between these two fiber arms, which is to say a difference in the acoustically induced phase shift (pressure sensitivity), $\Delta\phi/\phi\Delta P$, then acoustic pressures can be sensed with a minimum detectable pressure $P_{min}$, as:

$$P_{min} = \frac{\Delta\phi min}{\phi} \cdot \frac{1}{(\Delta\phi)/(\phi\Delta P)}$$

Figure 2:
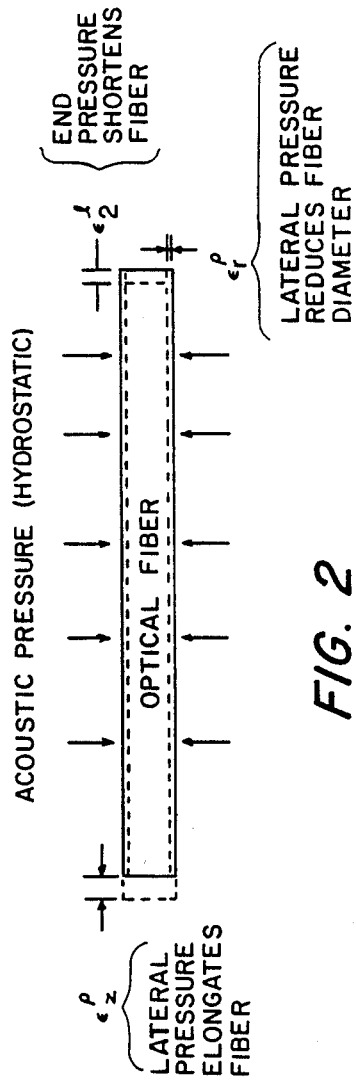
FIG. 2 is an optical fiber with illustrated acoustic pressures which induce phase shifts.
Figure 2A:
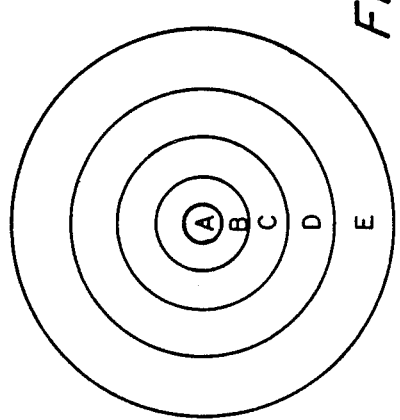
FIG. 2a is a cross-sectional view of fiber sensor prepared according to the invention.

FIG. 2 is a representation of an optical fiber in an acoustic condition wherein pressures thereon cause dimension changes which result in both changes in optical path length and changes in the refractive index as previously explained under "Background of the Invention" heading. FIG. 2a illustrates the different layers in a typical fiber. However, the substrate layer c and the soft first coating layer d are not necessary for this invention.

In this study, the acoustic response of coated fibers has been examined analytically. The coating material parameters necessary to do this, e.g., the elastic moduli, have been determined experimentally by appropriate measurements in bulk samples for the various coating materials.

Figure 3:
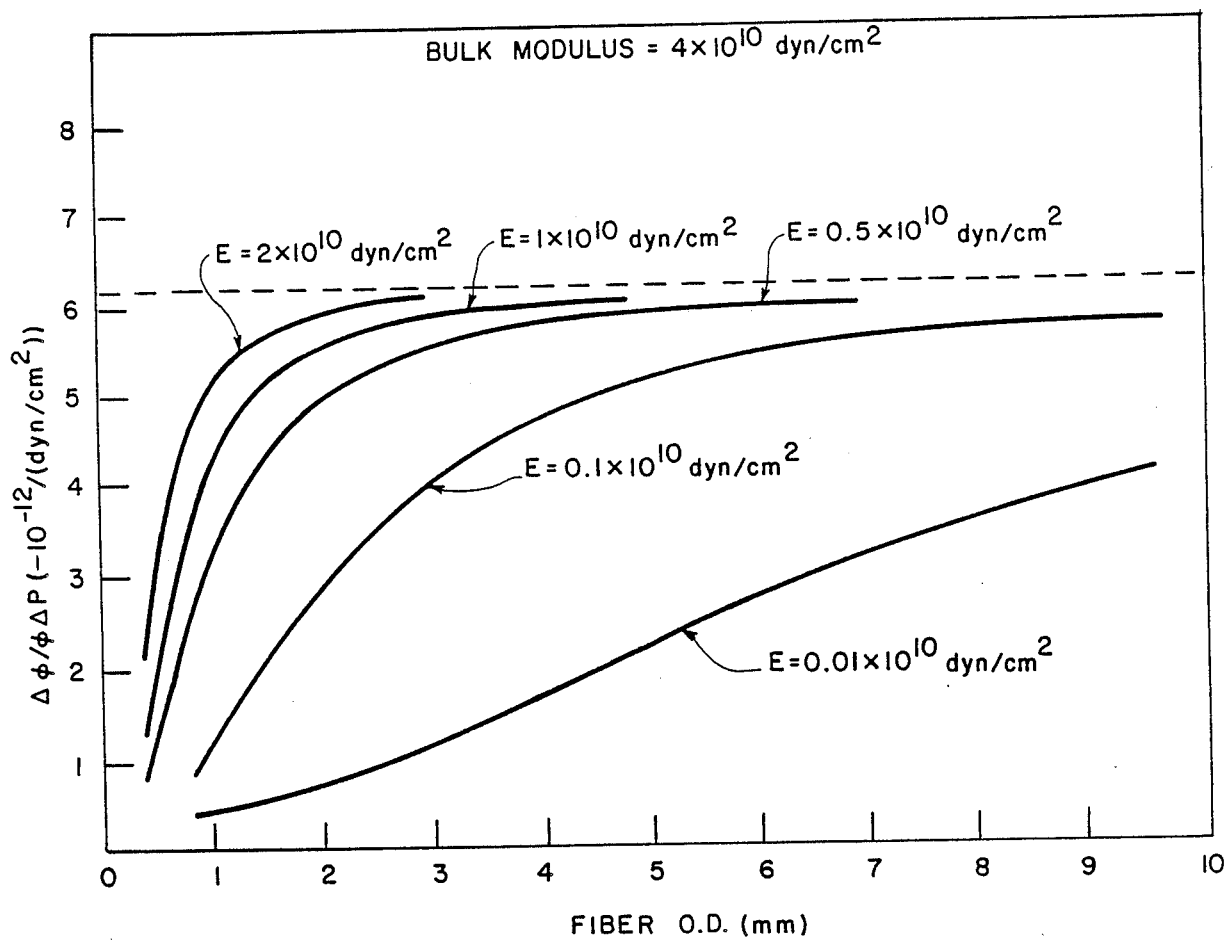
FIG. 3 illustrates the acoustic sensitivity of a fiber as a function of coating thickness for different coating Young's moduli with a constant bulk moduli.

In general, the acoustic sensitivity is a very strong function of the elastic moduli of the outer hard polymeric coating of the fiber. High sensitivity can be achieved with coatings of low bulk modulus and high Young's modulus materials. This can be understood as follows. FIG. 3 shows the acoustic sensitivity of a fiber as a function of coating thickness for different coating Young's moduli. All the other parameters of the fiber were kept constant and are listed in Table I. As can be seen from this figure, for thick coatings (somewhat greater than 0.5 mm) the sensitivity is determined by the bulk modulus which governs the fiber dimensional changes. For typical fibers (approx. 0.5 mm thickness), however, both the bulk modulus and the Young's modulus are important.

TABLE I

| STANDARD ITT SINGLE-MODE FIBER (WITHOUT OUTER COATING) | | | | |
|---|---|---|---|---|
| | Core | Cladding | Substrate | First Coating (Soft) |
| Composition | $SiO_2$ + traces of $GeO_2$ (0.1%) | 95% $SiO_2$ | $SiO_2$ | Silicone |
| Diameter (μm) | 4 | 26 | 84 | 250 |
| Young's Modulus ($10^{10}$ dyne/$cm^2$) | 72 | 65 | 72 | 0.0035 |
| Poisson's Ratio | 0.17 | 0.149 | 0.17 | 0.49947 |
| $P_{11}$ | 0.126 | | | |
| $P_{12}$ | 0.27 | | | |
| n | 1.458 | | | |

Figure 4:
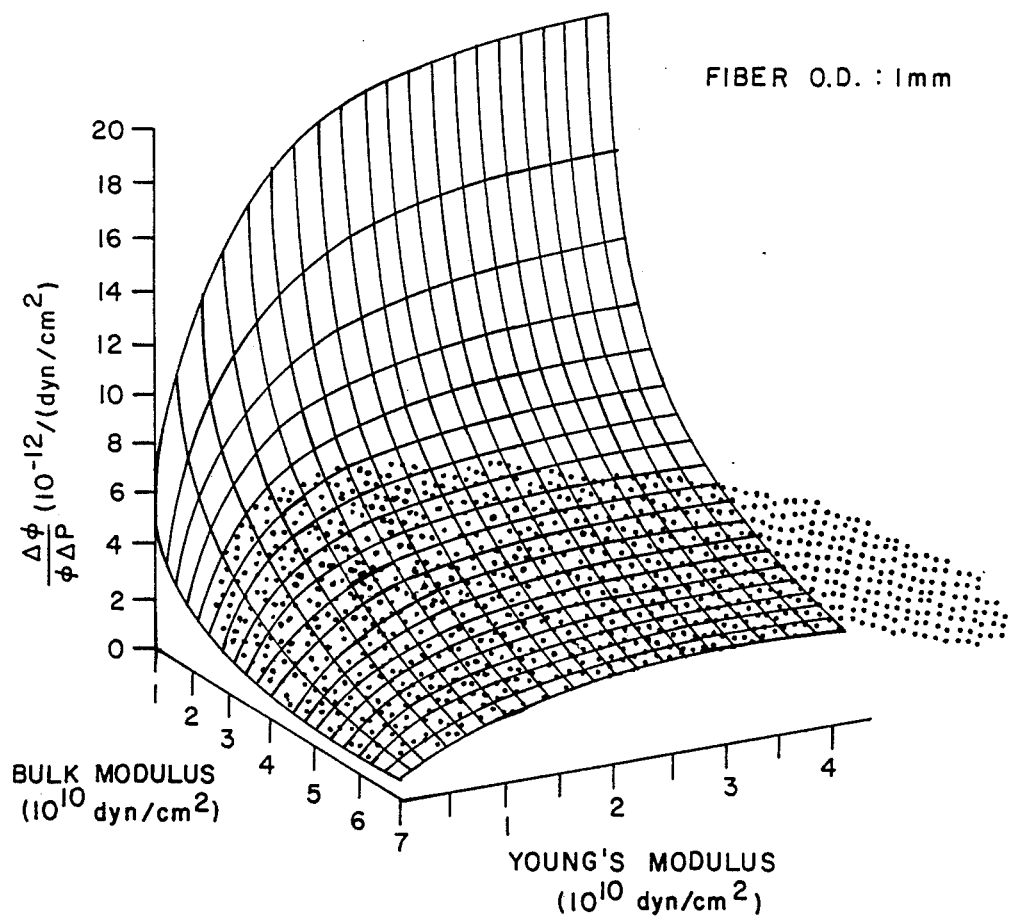
FIG. 4 illustrates the acoustic sensitivity of a fiber as a function of bulk modulus and Young's modulus.

FIG. 4 is a plot of pressure sensitivity vs bulk modulus and Young's modulus. The solid lines in the plot of FIG. 4 indicate the relationship between these three parameters which were derived analytically (as was FIG. 3) from the equations given in the "Background of the Invention". As can be seen from FIG. 4, high sensitivity requires low bulk and high Young's modulus coatings. In this case, the bulk modulus determines the "maximum" fiber dimensional changes, while the Young's modulus governs the fraction of these changes, or strains, which can communicate to the fiber core. Even for small coating thickness (much less than 0.5 mm) a high Young's modulus results in high sensitivity since it can communicate a high fraction of the applied stress to the fiber core, while low Young's modulus requires substantial coating thickness. The dotted area in FIG. 4 indicates materials which were actually found during the experimental investigation as given below in detail in Tables II-V.

Figure 5:
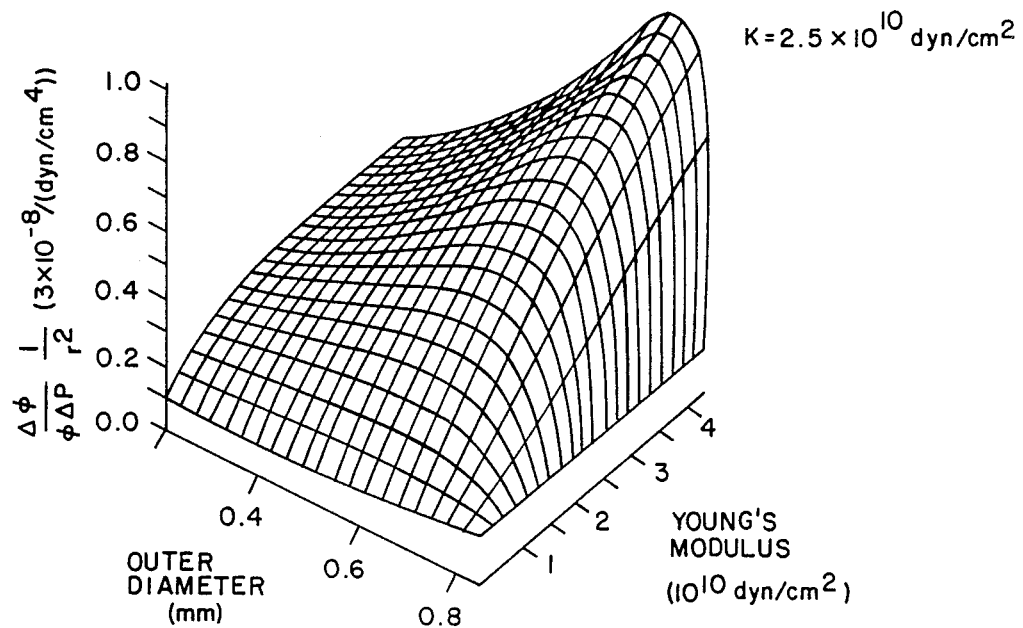
FIG. 5 illustrates the acoustic sensitivity per fiber cross-section vs fiber coating Young's modulus and outer diameter.

The important role of the Young's modulus is also apparent from FIG. 5 where $\Delta\phi/\phi\Delta P$ is shown as a function of thickness and Young's modulus of the coating. The bulk modulus was kept constant ($2.5 \times 10^{10}$ dyn/cm$_2$).

Thus in applications where the size of the sensor limits the maximum length of the sensing fiber the sensitivity per cross section should be maximized. This sensitivity is shown as a function of thickness and Young's modulus of the coating for constant bulk modulus ($2.5 \times 10^{10}$ dyn/cm$^2$). From this figure it can be seen that the sensitivity per cross section (a) increases with increasing Young's modulus and (b) is maximized with a Young's modulus dependent on coating thickness. Even for small coating thickness a high Young's modulus results in high sensitivity since it can communicate high fraction of the applied stress to the fiber core, while low Young's modulus requires substantial coating thickness. Therefore, in designing a compact sensor, both bulk and Young's moduli are important.

In FIG. 2a, the coating D which is applied directly to the glass waveguide is soft, such as a rubber or a soft UV curable elastomer, introduced for minimizing microbending losses. For typical thicknesses, these soft elastomers having a very small Young's modulus have very little effect on the sensitivity of typical fibers. The outer coating E is hard, such as a thermoset plastic or a hard UV curable elastomer, introduced for preserving glass strength, protecting fiber from adverse environments and facilitating fiber handling. The elastic moduli of polymers required to predict the fiber acoustic sensitivity were studied as a function of frequency and temperature. The frequency and temperature dependence of the Young's modulus was obtained from measurements on bulk samples in the form of rods with diameter 1.5-3.5 cm and length 5-15 cm. The bulk modulus was considered to be frequency independent and was measured at only one convenient frequency (1 MHz).

For most of the commonly used polymeric coating materials, the elastic moduli required to predict the fiber acoustic sensitivity are not generally known, particularly as a function of frequency and temperature. The elastic moduli of several commonly used thermoplastics, rubbers, and UV curable elastomers in the temperature range of 0°-35° C. for frequencies $10^2$ to $10^4$ and 1 MHz have been studied. Table II lists the generic names and the trade names of the polymers studied. Table II also lists the Young's and the bulk moduli measured experimentally at 1 MHz at three temperatures. The variations of the Young's and bulk moduli are also given in Table II.

TABLE II

Temperature Dependence Of Young's And Bulk Modulus Of Elastomers At 1 MHz

| | Generic Name | Trade Name | Temp. °C. | Young's Modulus $10^{10}$ dyn/cm$^2$ | Variation % | Bulk Modulus $10^{10}$ dyn/cm$^2$ | Variation % |
|---|---|---|---|---|---|---|---|
| (1) | Polytetra-fluoroethylene | TEFLON TFE Type II | 0 | 1.55 | | 2.93 | |
| | | | 23 | 1.21 | 72. | 2.61 | 20. |
| | | | 35 | 0.900 | | 2.45 | |
| (2) | Polytetra-fluoroethylene | TEFLON TFE Type I | 0 | 2.20 | | 3.62 | |
| | | | 27 | 1.35 | 85. | 2.96 | 22. |
| | | | 35 | 1.19 | | 3.10 | |
| (3) | Polytetra-fluoroethylene | TEFLON FEP 100 | 0 | 1.05 | | 3.49 | |
| | | | 26 | 0.833 | 29. | 2.98 | 21. |
| | | | 35 | 0.814 | | 2.88 | |
| (4) | polytetra-fluoroethylene | TEFZEL 280 | 0 | 1.94 | | 4.29 | |
| | | | 26 | 1.59 | 28. | 3.72 | 18. |
| | | | 35 | 1.51 | | 3.64 | |
| (5) | Polyamide | ZYTEL 101 | 0 | 3.86 | | 6.29 | |
| | | | 23 | 3.53 | 10. | 5.98 | 8. |
| | | | 35 | 3.52 | | 5.80 | |
| (6) | Polyamide | ZYTEL 105 | 0 | 3.94 | | 6.52 | |
| | | | 22 | 3.59 | 12. | 5.95 | 13. |
| | | | 35 | 3.52 | | 5.75 | |
| (7) | Acetal | DELRIN 150 | 0 | 5.11 | | 6.28 | |
| | | | 22 | 4.22 | 28. | 5.71 | 10. |
| | | | 35 | 4.00 | | 5.82 | |
| (8) | Acetal | DELRIN 107 | 0 | 4.98 | | 6.40 | |
| | | | 22 | 4.31 | 49. | 5.70 | 12. |
| | | | 35 | 3.35 | | 6.15 | |
| (9) | Acrylic | LUCITE | 0 | 6.52 | | 6.22 | |
| | | | 24 | 5.93 | 11. | 5.81 | 7. |
| | | | 35 | 5.85 | | 5.79 | |
| (10) | Phenyloxide | NORYL EN265 | 0 | 3.07 | | 4.14 | |
| | | | 22 | 2.95 | 7. | 3.86 | 8. |
| | | | 35 | 2.88 | | 3.84 | |
| (11) | POLYETHYLENE Low Density | | 0 | 2.25 | | 3.91 | |
| | | | 22 | 1.92 | 36. | 3.70 | 12. |
| | | | 35 | 1.65 | | 3.50 | |
| (12) | POLYETHYLENE | | 0 | 1.86 | | 3.87 | |
| | | | 23 | 2.01 | 8. | 2.97 | 51. |
| | | | 35 | 1.86 | | 2.56 | |
| (13) | POLYETHYLENE High density | ULTRA-ETHYLUX | 0 | 2.92 | | 4.55 | |
| | | | 25 | 2.29 | 37. | 4.26 | 15. |
| | | | 35 | 2.13 | | 3.94 | |
| (14) | POLYCARBONATE | LEXAN | 0 | 3.12 | | 4.82 | |

TABLE II-continued

Temperature Dependence Of Young's And Bulk Modulus Of Elastomers At 1 MHz

| | Generic Name | Trade Name | Temp. °C | Young's Modulus $10^{10}$ dyn/cm$^2$ | Variation % | Bulk Modulus $10^{10}$ dyn/cm$^2$ | Variation % |
|---|---|---|---|---|---|---|---|
| | | FL 930 | 22 | 2.76 | 17. | 4.57 | 12. |
| | | | 35 | 2.66 | | 4.30 | |
| (15) | POLYPROPYLENE | PROFAX-6823 | 0 | 4.72 | | 4.76 | |
| | | | 22 | 3.49 | 52. | 4.34 | 19. |
| | | | 35 | 3.10 | | 3.99 | |
| (16) | POLYPROPYLENE | PROFAX-7823 | 0 | 4.04 | | 4.42 | |
| | | | 22 | 2.55 | 78. | 3.83 | 23. |
| | | | 35 | 2.27 | | 3.59 | |
| (17) | POLYSTYRENE | | 0 | 3.97 | | 4.06 | |
| | | | 25 | 3.77 | 5. | 3.95 | 5. |
| | | | 35 | 3.76 | | 3.85 | |
| (18) | POLYSTYRENE | FOSTARENE-50 | 0 | 3.71 | | 3.84 | |
| | | | 22 | 3.65 | 5. | 3.76 | 4. |
| | | | 35 | 3.53 | | 3.70 | |
| (19) | POLYSTYRENE (Cross-Linked) | REXOLITE-1422 | 0 | 3.79 | | 4.01 | |
| | | | 22 | 3.65 | 4. | 3.82 | 6. |
| | | | 35 | 3.65 | | 3.78 | |
| (20) | POLYSULFONE | UDEL | 0 | 3.06 | | 5.08 | |
| | | | 22 | 2.93 | 8. | 4.92 | 6. |
| | | | 35 | 2.84 | | 4.80 | |
| (21) | POLYVINYL CHLORIDE | PVC | 0 | 4.50 | | 5.66 | |
| | | | 22 | 4.34 | 6. | 5.41 | 8. |
| | | | 35 | 4.25 | | 5.26 | |

As can be seen from this table, the least Young's modulus variation is obtained with Rexolite (19), polystyrene (17,18), polyvinyl chloride (21), Noryl (10), polysulfone (20), nylon (5,6), and acrylic (9). The least bulk modulus dependence is found in polystyrene (17,18), Rexolite (19), polysulfone (20), acrylic (9), Noryl (10), polyvinyl chloride (21), and nylon (5).

In order to obtain the frequency dependence of the elastic moduli of the polymers, the frequency dependence of the Young's modulus was studied in the range of $10^2$–$10^4$ Hz at three different temperatures assuming the bulk modulus to be frequency independent. It was found that away from any transitions the Young's modulus is proportional to the log of frequency, i.e. $E = A \log_{10} F + B$. The coefficients A and B of the best linear fit are listed in Table III. The last three columns give the overall frequency and temperature variation of the Young's modulus, the r.m.s. fitting error, and the number of experimental points. From Table III it can be seen that the used equation describes well the Young's modulus in most polymers in the frequency range of $10^2$–$10^4$ Hz.

In general, as it was expected, the Young's modulus decreases as temperature increases or as frequency decreases. Similarly, the bulk modulus decreases as temperature increases. Table III shows that least temperature and frequency variation is obtained with Rexolite (19), polystyrene (17,18), Noryl (10), polycarbonate (14), polysulfone (20), and nylon (6).

TABLE III

Young's Modulus Frequency Dependence

| | Elastomer | Temperature °C | $E = A\log_{10} F + B$ | | Variation % | Fitting Error % | No. of Points |
|---|---|---|---|---|---|---|---|
| | | | A | B | | | |
| (1) | TEFLON TFE Type II | 0 | .026 | 1.14 | | 0.8 | 20 |
| | | 23 | .096 | 0.59 | 143. | 2.3 | 42 |
| | | 35 | .072 | 0.37 | | 1.8 | 16 |
| (2) | TEFLON TFE Type I | 0 | .257 | 1.42 | | 1.6 | 11 |
| | | 27 | .145 | 1.09 | 119. | 0.7 | 12 |
| | | 35 | .114 | 0.89 | | 3.4 | 17 |
| (3) | TEFLON FEP 100 | 0 | .093 | 0.51 | | 2.4 | 16 |
| | | 23 | .053 | 0.55 | 34. | 2.1 | 16 |
| | | 35 | .028 | 0.60 | | 2.4 | 15 |
| (4) | TEFZEL | 0 | .095 | 1.34 | | 1.3 | 11 |
| | | 24 | .076 | 1.16 | 45. | .8 | 11 |
| | | 35 | .099 | 0.99 | | 2.4 | 18 |
| (5) | ZYTEL 101 | 0 | .081 | 3.33 | | 1.4 | 14 |
| | | 22 | .097 | 2.96 | 38. | 2.3 | 75 |
| | | 35 | .152 | 2.31 | | 1.8 | 9 |
| (6) | ZYTEL 105 | 0 | .077 | 3.10 | | 2.1 | 9 |
| | | 22 | .046 | 3.09 | 12. | .7 | 14 |
| | | 35 | .054 | 2.93 | | 1.5 | 9 |
| (7) | DELRIN 150 | 0 | .009 | 3.89 | | 1.7 | 8 |
| | | 22 | .055 | 3.33 | 22. | 1.4 | 31 |
| | | 35 | .055 | 3.10 | | 1.3 | 13 |
| (8) | DELRIN 107 | 0 | .163 | 3.37 | | 1.3 | 10 |
| | | 22 | .099 | 3.28 | 27. | 0.3 | 13 |
| | | 35 | .138 | 2.88 | | 0.8 | 11 |
| (9) | LUCITE | 0 | .224 | 5.10 | | 2.2 | 36 |
| | | 24 | .509 | 3.79 | 34. | 3.8 | 27 |

TABLE III-continued

Young's Modulus Frequency Dependence

| | Elastomer | Temperature °C | $E = A\log_{10} F + B$ A | B | Variation % | Fitting Error % | No. of Points |
|---|---|---|---|---|---|---|---|
| | | 35 | .722 | 3.04 | | 1.5 | 12 |
| (10) | NORYL | 0 | .034 | 2.65 | | .8 | 11 |
| | | 22 | .051 | 2.53 | 8. | .9 | 22 |
| | | 35 | .032 | 2.51 | | 1.5 | 14 |
| (11) | POLYETHYLENE | 0 | .001 | 1.94 | | 1.2 | 12 |
| | (Low Density) | 22 | .069 | 1.39 | 49. | 1.3 | 31 |
| | | 35 | .058 | 1.19 | | 1.3 | 18 |
| (12) | POLYETHYLENE | 0 | .130 | 0.699 | | 2.57 | 12 |
| | (Low Density) | 22 | .096 | 0.432 | 173. | 1.1 | 23 |
| | | 35 | .048 | 0.351 | | 2.7 | 28 |
| (13) | POLYETHYLENE | 0 | .132 | 2.22 | | 2.9 | 30 |
| | (High Density) | 22 | .116 | 1.68 | 57. | 1.9 | 30 |
| | | 35 | .133 | 1.48 | | 2.0 | 17 |
| (14) | POLYCARBONATE | 0 | .027 | 2.45 | | .6 | 15 |
| | | 22 | .047 | 2.23 | 10. | .6 | 26 |
| | | 35 | .003 | 2.33 | | 2.3 | 15 |
| (15) | POLYPROPYLENE | 0 | .324 | 2.93 | | .9 | 12 |
| | 6823 | 22 | .469 | 0.82 | 180. | 4.2 | 15 |
| | | 35 | .319 | 0.87 | | 4.7 | 12 |
| (16) | POLYPROPYLENE | 0 | .221 | 2.52 | | 2.5 | 13 |
| | 7823 | 27 | .283 | 0.64 | 238. | 5.6 | 10 |
| | | 35 | .309 | 0.39 | | 1.9 | 11 |
| (17) | POLYSTYRENE | 0 | .020 | 3.80 | | 5.4 | 9 |
| | | 25 | .061 | 3.57 | 7. | 1.3 | 23 |
| | | 35 | .031 | 3.55 | | 1.0 | 9 |
| (18) | POLYSTYRENE | 0 | .087 | 3.16 | | .9 | 10 |
| | | 22 | .037 | 3.32 | 7. | .7 | 14 |
| | | 35 | .052 | 3.17 | | 2.3 | 27 |
| (19) | REXOLITE | 0 | .040 | 3.43 | | 1.3 | 12 |
| | | 22 | .049 | 3.32 | 6. | 1.3 | 25 |
| | | 35 | .025 | 3.33 | | 1.9 | 14 |
| (20) | POLYSULFONE | 0 | .131 | 2.17 | | 3.5 | 13 |
| | | 22 | .069 | 2.42 | 11. | 0.3 | 15 |
| | | 35 | .032 | 2.51 | | 0.6 | 13 |
| (21) | POLYVINYL- | 0 | .123 | 3.46 | | .7 | 11 |
| | CHLORIDE | 22 | .129 | 3.45 | 22. | .7 | 10 |
| | | 35 | .225 | 2.80 | | .5 | 13 |
| (22) | HYTREL #7246 | 0 | .031 | 1.92 | | 2.3 | 13 |
| | | 22 | .163 | 1.80 | 147. | 1.1 | 20 |
| | | 35 | .148 | 0.53 | | 1.5 | 37 |
| (23) | HYTREL 6346 | 0 | .285 | 0.58 | | 3.2 | 13 |
| | | 24 | .187 | 0.25 | 176. | 1.2 | 18 |
| (24) | HYTREL 5556 | 0 | 1.088 | 1.29 | | 1.5 | 12 |
| | | 23 | .336 | 2.64 | 70. | 1.2 | 17 |
| (25) | HYTREL 5526 | 0 | 1.051 | 1.89 | | 1.6 | 18 |
| | | 22 | .532 | 1.94 | 109. | 2.8 | 20 |
| | | 35 | .311 | 2.30 | | 1.5 | 12 |
| (26) | HYTREL 4046 | 22 | 1.479 | 3.76 | 56. | 2.4 | 18 |
| | | 35 | 1.215 | 3.78 | | 4.9 | 14 |
| (27) | UV CURABLE | 0 | .207 | −1.22 | | 7.1 | 5 |
| | Hard | 26 | 2.641 | −2.59 | | 7.4 | 5 |
| | | 35 | 2.875 | −4.17 | | 8.0 | 4 |
| (28) | UV CURABLE | 0 | .644 | −1.21 | | 10.2 | 6 |
| | Soft | 22 | 1.324 | −3.22 | | 26.3 | 4 |
| | | 35 | 1.153 | −3.35 | | | |
| (29) | POLYURETHANE | 0 | .797 | 0.85 | | 1.3 | 28 |
| | EN-9 | 22 | .131 | 0.52 | 512. | 4.6 | 14 |
| | | 35 | .110 | 0.44 | | 3.0 | 14 |
| (30) | POLYURETHANE- | 0 | .674 | 0.44 | | 2.6 | 12 |
| | 3130 | 22 | .238 | 0.08 | 771. | 3.7 | 14 |
| | | 35 | .165 | 0.03 | | 10.3 | 14 |
| (31) | POLYURETHANE- | 0 | 1.961 | 1.52 | | 3.8 | 10 |
| | PR 1592 | 22 | .976 | 1.02 | 571. | 4.5 | 12 |
| | | 35 | .468 | 0.46 | | 3.8 | 12 |

Using the hydrostatic analysis the acoustic sensitivity of fibers coated with various polymers was obtained from the bulk and Young's moduli listed in Tables II and III. The results are given in Table IV. In these calculations, the fiber parameters were taken from Table I and the fiber o.d. was taken to be 0.35 mm, a "thin" fiber, 1 mm, as used in the tested sensors, and 4 mm, a "thick" coating case. The results for fibers with thick coatings maximum sensitivity is obtained with Polyurethane Conap (29) and Uralite 3130 (30), and Teflon TFE II (1) due to their low bulk modulus. For fibers with typical thickness coatings, however, maximum sensitivity is obtained with polystyrenes (17,18) and Rexolite (19) due primarily to their high Young's modulus, and with Teflon TFE (1,2). The smallest temperature and frequency dependence is obtained with polystyrene (18), polyvinyl chloride (21), Lucite (9), and Noryl (10). Small dependence is also obtained with Delvin (7) and Zytel (101). On the other hand, high dependence is obtained with the soft UV curable elastomer due to the big frequency and temperature dependence of the Young's modulus.

TABLE IV

Acoustic Sensitivity of Fibers Coated with Various Elastomers
$[\Delta\phi/\phi\Delta P \ (10^{-12}/(dyn/cm^2))]$

| | Polymer | Temp (°C.) | Typical Fibers (o.d. 0.35 mm) Frequency (Hz) | | | Total Variation (%) | Fiber (o.d. 1 mm) Frequency (Hz) | | | Total Variation (%) | Thick Fibers (o.d. 4 mm) Frequency (Hz) | | | Total Variation (%) |
|---|---|---|---|---|---|---|---|---|---|---|---|---|---|---|
| | | | $10^2$ | $10^3$ | $10^4$ | | $10^2$ | $10^3$ | $10^4$ | | $10^2$ | $10^3$ | $10^4$ | |
| (1) | TEFLON TFE Type II | 0 | 1.69 | 1.72 | 1.74 | | 6.23 | 6.25 | 6.27 | | 8.38 | 8.37 | 8.35 | |
| | | 23 | 1.36 | 1.48 | 1.60 | 39 | 6.10 | 6.33 | 6.56 | 16 | 9.31 | 9.34 | 9.36 | 15 |
| | | 35 | 1.06 | 1.17 | 1.27 | | 5.48 | | 6.09 | | 9.81 | 9.84 | 9.86 | |
| (2) | TEFLON TFE Type I | 0 | 1.99 | 2.18 | 2.37 | | 5.62 | 5.79 | 5.88 | | 6.79 | 6.81 | 6.83 | |
| | | 27 | 1.76 | 2.54 | 3.31 | 51 | 5.99 | 6.12 | 6.25 | 10 | 7.77 | 7.78 | 7.78 | 15 |
| | | 35 | 1.60 | 1.69 | 1.77 | | 5.85 | 5.97 | 6.09 | | 7.87 | 7.91 | 7.95 | |
| (3) | TEFLON FEP 100 | 0 | 0.98 | 1.07 | 1.16 | | 4.27 | 4.49 | 4.71 | | 6.73 | 6.81 | 6.88 | |
| | | 23 | 1.08 | 1.13 | 1.18 | 17 | 4.99 | 5.09 | 5.19 | 19 | 8.04 | 8.01 | 7.97 | 19 |
| | | 35 | 1.11 | 1.14 | 1.17 | | 5.12 | 5.21 | 5.29 | | 8.28 | 8.31 | 8.33 | |
| (4) | TEFZEL 280 | 0 | 1.43 | 1.50 | 1.57 | | 4.43 | 4.52 | 4.60 | | 5.59 | 5.63 | 5.67 | |
| | | 24 | 1.47 | 1.52 | 1.56 | 12 | 5.00 | 5.05 | 5.09 | 15 | 6.56 | 6.58 | 6.50 | 17 |
| | | 35 | 1.38 | 1.48 | 1.57 | | 4.91 | 5.06 | 5.20 | | 6.59 | 6.66 | 6.73 | |
| (5) | ZYTEL 101 | 0 | 1.79 | 1.83 | 1.86 | | 3.48 | 3.51 | 3.54 | | 3.84 | 3.86 | 3.87 | |
| | | 22 | 1.77 | 1.80 | 1.83 | 11 | 3.65 | 3.66 | 3.66 | 6 | 4.07 | 4.06 | 4.04 | 8 |
| | | 35 | 1.66 | 1.69 | 1.71 | | 3.64 | 3.68 | 3.72 | | 4.17 | 4.18 | 4.19 | |
| (6) | ZYTEL 105 | 0 | 1.66 | 1.69 | 1.71 | | 3.33 | 3.35 | 3.36 | | 3.70 | 3.70 | 3.70 | |
| | | 22 | 1.78 | 1.80 | 1.82 | 9 | 3.66 | 3.68 | 3.70 | 10 | 4.08 | 3.10 | 4.11 | 10 |
| | | 35 | 1.73 | 1.75 | 1.77 | | 3.63 | 3.64 | 3.65 | | 4.07 | 4.07 | 4.07 | |
| (7) | DELRIN 150 | 0 | 1.95 | 1.95 | 1.94 | | 3.58 | 3.57 | 3.56 | | 3.89 | 3.88 | 3.87 | |
| | | 22 | 1.97 | 1.99 | 2.00 | 9 | 3.89 | 3.90 | 3.90 | 9 | 4.30 | 4.30 | 4.29 | 10 |
| | | 35 | 1.83 | 1.85 | 1.87 | | 3.76 | 3.77 | 3.77 | | 4.17 | 4.17 | 4.17 | |
| (8) | DELRIN 107 | 0 | 1.83 | 1.89 | 1.95 | | 3.46 | 3.49 | 3.52 | | 3.78 | 3.80 | 3.82 | |
| | | 22 | 1.98 | 2.02 | 2.06 | 17 | 3.89 | 3.91 | 3.93 | 12 | 4.29 | 4.30 | 4.31 | 12 |
| | | 35 | 1.71 | 1.76 | 1.80 | | 3.50 | 3.52 | 3.54 | | 3.91 | 3.91 | 3.91 | |
| (9) | LUCITE | 0 | 2.45 | 2.50 | 2.55 | | 3.67 | 3.73 | 3.78 | | 3.97 | 3.97 | 3.96 | |
| | | 24 | 2.39 | 2.54 | 2.68 | 36 | 3.97 | 4.01 | 4.05 | 14 | 4.24 | 4.25 | 4.25 | 8 |
| | | 35 | 1.71 | 1.76 | 1.80 | | 3.50 | 3.52 | 3.54 | | 3.91 | 3.91 | 3.91 | |
| (10) | NORYL | 0 | 2.24 | 2.27 | 2.29 | | 5.18 | 5.20 | 5.22 | | 5.91 | 5.92 | 5.93 | |
| | | 22 | 2.36 | 2.39 | 2.41 | 6 | 5.59 | 5.60 | 5.61 | 8 | 6.42 | 6.41 | 6.40 | 8 |
| | | 35 | 2.31 | 2.34 | 2.37 | | 5.55 | 5.59 | 5.62 | | 6.39 | 6.42 | 6.45 | |
| (11) | POLYETHYLENE (Low Density) | 0 | 1.87 | 1.87 | 1.87 | | 5.21 | 5.21 | 5.21 | | 6.29 | 6.29 | 6.29 | |
| | | 22 | 1.65 | 1.70 | 1.75 | 18 | 5.22 | 5.36 | 5.45 | 4 | 6.60 | | 6.58 | 10 |
| | | 35 | 1.54 | 1.60 | 1.65 | | 5.27 | 5.36 | 5.45 | | 6.90 | 6.96 | 7.01 | |
| (12) | POLYETHYLENE (Low Density) | 0 | 1.13 | 1.23 | 1.33 | | 4.32 | 4.49 | 4.66 | | 6.14 | 6.16 | 6.18 | |
| | | 22 | 1.07 | 1.18 | 1.29 | 43 | 5.04 | 5.29 | 5.54 | 22 | 8.33 | 8.32 | 8.31 | 26 |
| | | 35 | 1.72 | 1.81 | 1.89 | | 5.03 | 5.11 | 5.18 | | 6.18 | 6.20 | 6.22 | |
| (13) | POLYETHYLENE (High Density) | 0 | 1.93 | 2.01 | 2.08 | | 4.66 | 4.71 | 4.75 | | 5.39 | 5.40 | 5.41 | |
| | | 22 | 1.71 | 1.78 | 1.85 | 18 | 4.75 | 4.81 | 4.86 | 10 | 5.74 | 5.75 | 5.76 | 13 |
| | | 35 | 1.72 | 1.81 | 1.89 | | 5.03 | 5.11 | 5.18 | | 6.18 | 6.20 | 6.22 | |
| (14) | POLYCARBONATE | 0 | 1.83 | 1.83 | 1.83 | | 4.36 | 4.36 | 4.36 | | 5.04 | 5.04 | 5.04 | |
| | | 22 | 1.86 | 1.85 | 1.84 | 6 | 4.38 | 4.49 | 4.59 | 11 | 5.04 | 5.21 | 5.37 | 12 |
| | | 35 | 1.88 | 1.92 | 1.96 | | 4.59 | 4.75 | 4.90 | | 5.33 | 5.53 | 5.73 | |
| (15) | POLYPROPYLENE 6823 | 0 | 2.38 | 2.52 | 2.66 | | 4.69 | 4.75 | 4.80 | | 5.16 | 5.18 | 5.20 | |
| | | 22 | 1.59 | 1.55 | 1.52 | 43 | 4.59 | 4.77 | 4.94 | 12 | 5.63 | 5.64 | 5.64 | 16 |
| | | 35 | 2.13 | 2.05 | 1.97 | | 4.80 | 5.00 | 5.20 | | 6.08 | 6.12 | 6.17 | |
| (16) | POLYPROPYLENE 7823 | 0 | 2.25 | 2.36 | 2.47 | | 4.95 | 4.99 | 5.03 | | 5.59 | 5.59 | 5.58 | |
| | | 27 | 1.36 | 1.48 | 1.59 | 49 | 4.76 | 4.98 | 5.20 | 13 | 6.35 | 6.37 | 6.38 | 18 |
| | | 35 | 1.25 | 1.52 | 1.78 | | 4.80 | 5.14 | 5.48 | | 6.73 | 6.79 | 6.84 | |
| (17) | POLYSTYRENE | 0 | 2.91 | 2.92 | 2.92 | | 5.61 | 5.60 | 5.59 | | 6.13 | 6.13 | 6.12 | |
| | | 25 | 2.91 | 2.94 | 2.97 | 2 | 5.73 | 5.75 | 5.76 | 5 | 6.30 | 6.30 | 6.30 | 5 |
| | | 35 | 2.93 | 2.95 | 2.97 | | 5.85 | 5.87 | 5.88 | | 6.44 | 6.45 | 6.46 | |
| (18) | POLYSTYRENE | 0 | 2.77 | 2.79 | 2.81 | | 5.79 | 5.74 | 5.68 | | 6.43 | 6.36 | 6.28 | |
| | | 22 | 2.87 | 2.90 | 2.92 | 7 | 5.94 | 5.96 | 5.98 | 5 | 6.59 | 6.61 | 6.62 | 6 |
| | | 35 | 2.84 | 2.98 | 2.91 | | 6.00 | 6.02 | 6.04 | | 6.70 | 6.70 | 6.70 | |
| (19) | REXOLITE | 0 | 2.77 | 2.79 | 2.81 | | 5.60 | 5.61 | 5.61 | | 6.19 | 6.19 | 6.18 | |
| | | 22 | 2.84 | 2.88 | 2.91 | 5 | 5.85 | 5.88 | 5.90 | 5 | 6.49 | 6.51 | 6.52 | 6 |
| | | 35 | 2.85 | 2.87 | 2.88 | | 5.91 | 5.92 | 5.92 | | 6.57 | 6.57 | 6.56 | |
| (20) | POLYSULFONE | 0 | 1.74 | | 1.84 | | 4.15 | | 4.19 | | 4.80 | | 4.79 | |
| | | 22 | 1.84 | | 1.89 | 10 | 4.32 | | 4.33 | 7 | 4.98 | | 4.94 | 6 |
| | | 35 | 1.88 | | 1.93 | | 4.41 | | 4.46 | | 5.07 | | 5.11 | |
| (21) | POLYVINYL-CHLORIDE | 0 | 2.07 | | 2.16 | | 3.94 | | 3.97 | | 4.31 | | 4.32 | |
| | | 22 | 2.16 | | 2.26 | 9 | 4.13 | | 4.17 | 7 | 4.52 | | 4.53 | 8 |
| | | 35 | 2.03 | | 2.22 | | 4.18 | | 4.25 | | 4.65 | | 4.66 | |
| (22) | HYTREL 7246 | 0 | 1.49 | | 1.52 | | 3.97 | | 4.00 | | 4.76 | | 4.76 | |
| | | 22 | 1.12 | | 1.34 | 37 | 3.93 | | 4.22 | 9 | 5.33 | | 5.39 | 16 |
| | | 35 | 0.96 | | 1.17 | | 3.82 | | 4.16 | | 5.66 | | 5.65 | |
| (23) | HYTREL 6346 | 0 | 1.03 | | 1.34 | | 3.49 | | 3.82 | | 4.70 | | 4.70 | |
| | | 24 | 0.76 | | 1.01 | 43 | 3.18 | | 3.69 | 17 | 5.19 | | 5.18 | 9 |
| | | 0 | | | | | | | | | | | | |
| (24) | HYTREL | 0 | 3.12 | | | | 6.41 | | | | 7.11 | | | |

TABLE IV-continued

Acoustic Sensitivity of Fibers Coated with Various Elastomers
[$\Delta\phi/\phi\Delta P$ ($10^{-12}$/(dyn/cm$^2$))]

|   | Polymer | Temp (°C.) | Typical Fibers (o.d. 0.35 mm) Frequency (Hz) | | | Total Variation (%) | Fiber (o.d. 1 mm) Frequency (Hz) | | | Total Variation (%) | Thick Fibers (o.d. 4 mm) Frequency (Hz) | | | Total Variation (%) |
|---|---|---|---|---|---|---|---|---|---|---|---|---|---|---|
|   |   |   | $10^2$ | $10^3$ | $10^4$ |   | $10^2$ | $10^3$ | $10^4$ |   | $10^2$ | $10^3$ | $10^4$ |   |
|   | 5556 | 23 |   |   |   |   |   |   |   |   |   |   |   |   |
|   |   | 35 |   |   |   |   |   |   |   |   |   |   |   |   |
| (29) | POLYURETHANE CONAP | 0 | 3.17 |   | 4.59 |   | 8.43 |   | 8.93 |   | 9.82 |   | 9.76 |   |
|   |   | 22 | 1.48 |   | 1.83 | 69 | 6.72 |   | 7.38 | 25 | 10.28 |   | 10.33 | 15 |
|   |   | 35 | 1.43 |   | 1.77 |   | 7.05 |   | 7.82 |   | 11.45 |   | 11.52 |   |
| (30) | POLYURETHANE-3130 | 0 | 1.98 |   | 2.98 |   | 5.84 |   | 6.48 |   | 7.16 |   | 7.27 |   |
|   |   | 22 | 1.05 |   | 1.63 | 72 | 5.20 |   | 6.49 | 31 | 8.94 |   | 9.11 | 26 |
|   |   | 35 | 0.83 |   | 1.29 |   | 4.46 |   | 6.06 |   | 9.31 |   | 9.66 |   |
| (31) | POLYURETHANE-1592 | 0 | 3.84 |   | 5.17 |   | 6.20 |   | 6.47 |   | 6.56 |   | 6.61 |   |
|   |   | 22 | 2.92 |   | 4.09 | 45 | 6.58 |   | 7.01 | 16 | 7.44 |   | 7.50 | 46 |
|   |   | 35 | 4.46 |   | 2.84 |   | 9.82 |   | 7.43 |   | 12.08 |   | 8.71 |   |

In order to increase the acoustic sensitivity and to minimize acceleration effects, fibers with substantially thicker coatings than those of the standard communication fibers (0.5–0.6 mm o.d.) must be used. The first thick fibers were coated with nylon up to 1 mm o.d. It was found, however, that the acoustic sensitivity of these thick fibers, even though initially was high and in agreement with that predicted analytically (Table IV), deteriorated fast as the fibers were immersed in water (or a hydrocarbon solvent). After careful examination, it was found that the thick nylon coating had poor bonding to silicon and big air gaps were in the nylon-silicone interface. When such fibers are immersed in liquids, axial stresses can not communicate from the outer coating to the inner coating. Such fibers can be used only as reference or lead fibers since they are desensitized to pressure and acceleration at the same time. The poor interface between nylon and silicone is formed during the extrusion process when the outer surface of the thick nylon is cooled first, becomes rigid and pulls the inner soft nylon away from the primary coating.

Several solutions to the thick coating delamination problem are possible. Chemical bonding between the primary and the outer coating will certainly result in strong bonding. Also, applying the outer coating in multipasses is expected to enhance fiber bonding. In addition to silicone, U.V. curable polymers are expected to have good bonding with glass, contrary to others used in communication applications which have poor bonding to glass in order to facilitate mechanical removal of the coating in the field.

In order to obtain bonding between the outer thick coating and silicone, a modified nylon was used containing 10% silicone molecules cross linked to nylon molecules. Such modified nylon is expected to have chemical bonding with the primary silicone copating when the silicone molecules link together.

Table V, column 1, lists the most promising polymers as fiber coatings for interferometric sensor. The second column shows the calculated acoustic sensitivity of single mode fibers (Table I) coated with these polymers up to 1 mm o.d. The third column shows the overall variation of the acoustic sensitivity in the temperature range of 0°–35° C. and for frequencies $10^2$–$10^4$ Hz. The fourth and fifth columns show the predicted minimum detectable pressure when the reference fiber of the interferometric sensor is coated with a 0.35 mm o.d. nylon (zytel 101) and a 110 o.d. aluminum, respectively. In these calculations it is assumed that the sensing fiber is 30 m and the minimum detectable phase modulation is $10^{-6}$ radians for 1 Hz bandwidth (Eq. (1)). Table V shows that the highest sensitivity is obtained for TFE (due primarily to its low bulk modulus) with, however, significant temperature and frequency variation. Rexolite (a cross-linked styrene polymer) and TFA-340 also give high sensitivity and very small variation. Noryl gives high sensitivity (due to its high bulk modulus) and the smallest temperature and frequency variation. In general, good sensitivity is obtained with all Teflons as a result of their low bulk modulus.

TABLE V

Optimized Coatings

| Coating o.d. | P ($10^{-12}$/dyn/cm$^2$) | Temp. and Frequency Variation % | $P_{min}$ (Ref. Fiber Nylon:0.35 mm o.d. dB ref 1μ Pa) | $P_{min}$ (Ref. Fiber Al, 110 μm dB ref 1μ Pa) |
|---|---|---|---|---|
| TEFLON[1] TFE | 6.13 | 15 | 37.2 | 34.3 |
| POLYSTYRENE | 5.96 | 5 | 37.5 | 34.5 |
| REXOLITE | 5.87 | 5 | 37.7 | 34.7 |
| TEFLON TFA-340 | 5.87 | 6 | 37.7 | 34.7 |
| NORYL | 5.59 | 4 | 38.3 | 35.1 |
| POLYETHYLENE (Low Density) | 5.26 | 6 | 39.1 | 35.1 |
| TEFLON FEP 100 | 5.12 | 18 | 39.5 | 35.9 |
| TEFZEL 280 | 5.05 | 13 | 39.6 | 36.0 |
| POLYEHTYLENE (High DENSITY) | 4.79 | 9 | 40.4 | 36.5 |
| POLYPROPYLENE | 4.79 | 16 | 40.4 | 36.5 |

TABLE V-continued

| | Optimized Coatings | | | |
|---|---|---|---|---|
| Coating o.d. | P ($10^{-12}$/dyn/cm$^2$) | Temp. and Frequency Variation % | P$_{min}$ (Ref. Fiber Nylon:0.35 mm o.d. dB ref 1μ Pa) | P$_{min}$ (Ref. Fiber Al, 110 μm dB ref 1μ Pa) |
| 6823 HYTREL | 4.09 | 16 | 42.7 | 37.9 |
| 7246 NYLON 101 | 3.65 | 3 | 44.6 | 38.9 |

The foregoing has described an optical fiber sensor having optimized coatings for providing maximum acoustic pressure sensitivity. As was mentioned above, high sensitivity is obtained with fiber coating polymers having low bulk modulus and/or high Young's modulus. With high Young's modulus polymers, high sensitivity can be obtained with a relatively thin coating, which is highly desirable when there is restriction in space.

Obviously, numerous modifications and variations of the present invention are possible in light of the above teachings. For example any medium having high optical transparency, e.g. glass or plastic, could be used as the core and cladding layers in the disclosed fiber. It is therefore to be understood that within the scope of the appended claims, the invention may be practiced otherwise than as specifically described herein.

What is claimed as new and is desired to be secured by Letters Patent of the United States is:

1. An optical fiber sensor with maximum pressure sensitivity, $\Delta\phi/\phi\Delta P$, made by:
    selecting a material for the fiber core and substrate;
    measuring the Young's modulus, Poisson's Ratio, elastoptic coefficients, and refractive index of said selected core and substrate materials;
    selecting a diameter for said core and substrate;
    identifying candidate materials for a soft coating, and a hard coating to be applied as layers over said core and substrate;
    measuring the Young's modulus and the Poisson's Ratio for each said candidate material;
    selecting materials for said soft coating, and hard coating from said candidate materials;
    selecting a minimum and a maximum thickness for said soft coating, and hard coating layers;
    setting said soft and hard coating thicknesses to said minimum thicknesses;
    equating the polar stresses in said core, substrate, soft, and hard coating layers to the matrix product of Lame parameters and the core cylindrical strains;
    solving said matrix product to obtain equations expressing said cylindrical strains in terms of the constants $U_0^i$, $U_1^i$, $W_0^i$;
    applying boundary conditions to determine values for said constants;
    calculating said cylindrical strains from said constant values;
    calculating said pressure sensitivity from said cylindrical strains, said refractive index, and said elasto-optic coefficients;
    iterating above said calculations from said minimum to said maximum thickness of said hard coating;
    incrementally increasing the thickness of said soft layer from said minimum to said maximum thickness;
    repeating above said calculations for each said incremented thickness;
    identifying the combination of thickness for said soft coating and hard coating that generates a maximum pressure sensitivity for the selected coating materials;
    repeating said calculations and iterations to identify a maximum pressure sensitivity for each said candidate material;
    selecting the greatest maximum pressure sensitivity from among said identified maximum sensitivities;
    identifying said soft and hard coating materials and said thicknesses that generated said greatest maximum pressure sensitivity;
    fabricating a fiber optic sensor fiber using said selected core and substrate material, said identified soft and hard coating materials, of said identified thicknesses.

2. An optical fiber sensor with maximum pressure sensitivity per unit of cross sectional area, $\Delta\phi/\phi\Delta P * 1/r^2$, made by:
    selecting a material for the fiber core and substrate;
    measuring the Young's modulus, Poisson's Ratio, elasto-optic coefficients, and refractive index of said selected core and substrate materials;
    selecting a diameter for said core and substrate;
    identifying candidate materials for a soft coating, and a hard coating to be applied as layers over said core and substrate;
    measuring the Young's modulus and the Poisson's Ratio for each said candidate material;
    selecting materials for said soft coating, and hard coating from said candidate materials;
    selecting a minimum and a maximum thickness for said soft coating and hard coating layers,
    setting said soft and hard coating thicknesses to said minimum thicknesses;
    equating the polar stresses in said core, substrate, soft, and hard coating layers to the matrix product of Lame parameters and the core cylindrical strains;
    solving said matrix product to obtain equations expressing said cylindrical strains in terms of the constants $U_0^i$, $U_1^i$, $W_0^i$;
    applying boundary conditions to determine values for said constants;
    calculating said cylindrical strains from said constant values;
    calculating said pressure sensitivity per unit cross sectional area from said cylindrical strains, said refractive index, and said elasto-optic coefficients;
    dividing said pressure sensitivity by the square of the radius to the outer surface of said fiber;
    iterating above said calculations from said minimum to said maximum thickness of said hard coating;

incrementally increasing the thickness of said soft layer from said minimum to said maximum thickness;

repeating above said calculations for each said incremented thickness;

identifying the combination of thickness for said soft coating and hard coating that generates a maximum pressure sensitivity for the selected coating materials;

repeating said calculations and iterations to identify a maximum pressure sensitivity for each said candidate material;

selecting the greatest maximum pressure sensitivity from among said identified maximum sensitivities;

identifying said soft and hard coating materials and said thicknesses that generated said greatest maximum pressure sensitivity per unit cross sectional area;

fabricating a fiber optic sensor fiber using said selected core and substrate material, said identified soft and hard coating materials, of said identified thicknesses.

* * * * *